United States Patent [19]

Schap

[11] Patent Number: 5,456,283
[45] Date of Patent: Oct. 10, 1995

[54] INFINITE HYDRAULIC CHECK

[75] Inventor: William W. Schap, Fruitport, Mich.

[73] Assignee: ITT Corporation, New York, N.Y.

[21] Appl. No.: 111,791

[22] Filed: Aug. 25, 1993

[51] Int. Cl.$^6$ ............... F16K 21/10; F16F 9/50
[52] U.S. Cl. ............... 137/514.7; 137/514.5; 188/282; 188/322.15
[58] Field of Search ............... 137/514.5, 514.7; 188/322.15, 322.22, 317, 282

[56] References Cited

U.S. PATENT DOCUMENTS

| | | | |
|---|---|---|---|
| 1,439,007 | 12/1922 | Ledwinka | 16/86 A |
| 1,849,417 | 3/1932 | Bassett | 16/51 |
| 2,027,423 | 1/1936 | Gardiner | 16/84 |
| 2,043,976 | 6/1936 | Schonitzer | 16/86 C |
| 2,184,607 | 12/1939 | Swanson | 16/82 |
| 2,202,303 | 5/1940 | Swanson | 16/82 |
| 2,268,976 | 1/1942 | Westrope | 16/86 C |
| 2,434,524 | 1/1948 | Swanson | 16/54 |
| 2,485,937 | 10/1949 | Swanson | 16/54 |
| 2,490,258 | 12/1949 | Diebel | 16/54 |
| 2,493,118 | 1/1950 | Diebel | 137/220 |
| 2,719,612 | 10/1955 | de Previnquires | 188/317 X |
| 2,889,571 | 6/1959 | Moore | 16/82 |
| 2,941,629 | 6/1960 | Rohacs | 137/514.5 X |
| 2,948,915 | 8/1960 | Vose | 16/82 |
| 2,969,085 | 1/1961 | Nystrom et al. | 137/514.7 |
| 3,042,957 | 7/1962 | Muessel et al. | 16/62 |
| 3,118,167 | 1/1964 | Morris et al. | 16/82 |
| 3,584,331 | 6/1971 | D'Hooge | 16/82 |
| 3,610,276 | 10/1971 | Seelman et al. | 137/514.5 X |
| 3,651,903 | 3/1972 | Butler et al. | 188/290 |
| 3,696,462 | 10/1972 | Martin | 16/49 |
| 3,706,362 | 12/1972 | Faure | 188/322.15 X |
| 3,765,053 | 10/1973 | Anweiler | 16/49 |
| 3,867,289 | 2/1975 | Ortega | 137/514.5 X |
| 3,952,365 | 4/1976 | Grisebach | 16/52 |
| 4,098,375 | 7/1978 | Kornylak | 188/290 |
| 4,106,596 | 8/1978 | Hausmann | 188/282 X |
| 4,194,265 | 3/1980 | Zimmermann | 16/82 |
| 4,234,996 | 11/1980 | Jentsch | 16/52 |
| 4,325,468 | 4/1982 | Siorek | 188/322.15 X |
| 4,632,228 | 12/1986 | Oster et al. | 188/322.22 X |
| 4,653,141 | 3/1987 | Converse | 16/82 |
| 4,670,941 | 6/1987 | Peterson | 16/332 |
| 4,689,849 | 9/1987 | Eger et al. | 16/82 |
| 4,693,454 | 9/1987 | Tsuchiya et al. | 188/322.15 X |
| 4,756,051 | 7/1988 | Shy | 16/50 |
| 4,823,922 | 4/1989 | Ergun | 188/317 X |
| 4,826,094 | 5/1989 | Whiteley | 188/317 X |

Primary Examiner—John Rivell
Attorney, Agent, or Firm—Dykema Gossett

[57] ABSTRACT

An infinite hydraulic check for use with a door that maintains the door in any position until an appropriate check effort is applied to release the door from the position. The check includes an annular needle cavity with a closed first portion and a second portion, the second portion including a by-pass port along an inner circumference. An annular needle is received in the needle cavity. The by-pass port is obstructed when the needle is in a partial open position. Hydraulic fluid driven through an inlet orifice gradually displaces fluid from the closed first portion of the cavity, forcing the needle further into the cavity, unobstructing the by-pass port and permitting increased fluid flow. The controlled activation of the damped check release reduces noise.

22 Claims, 2 Drawing Sheets

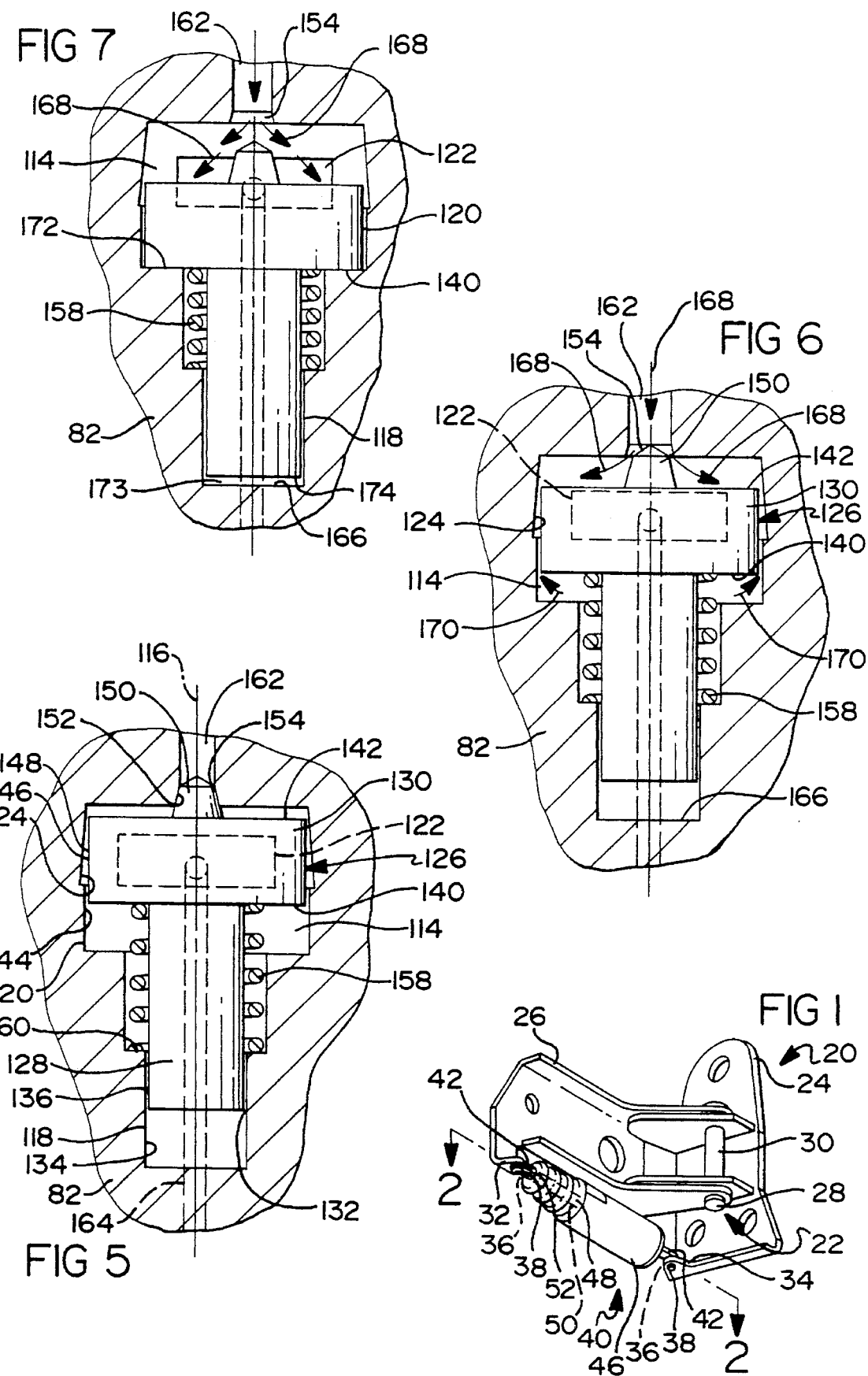

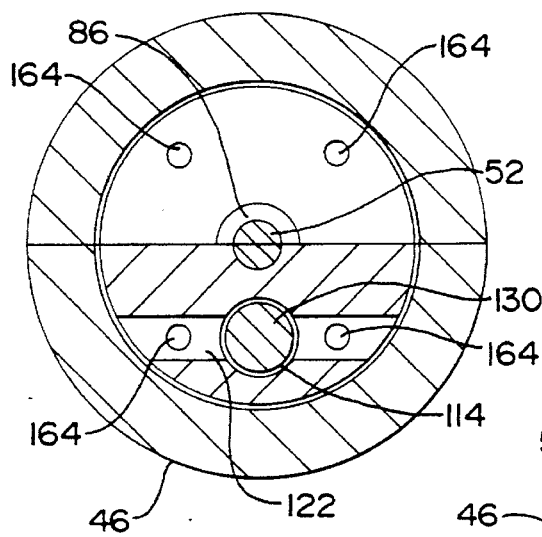
FIG 4
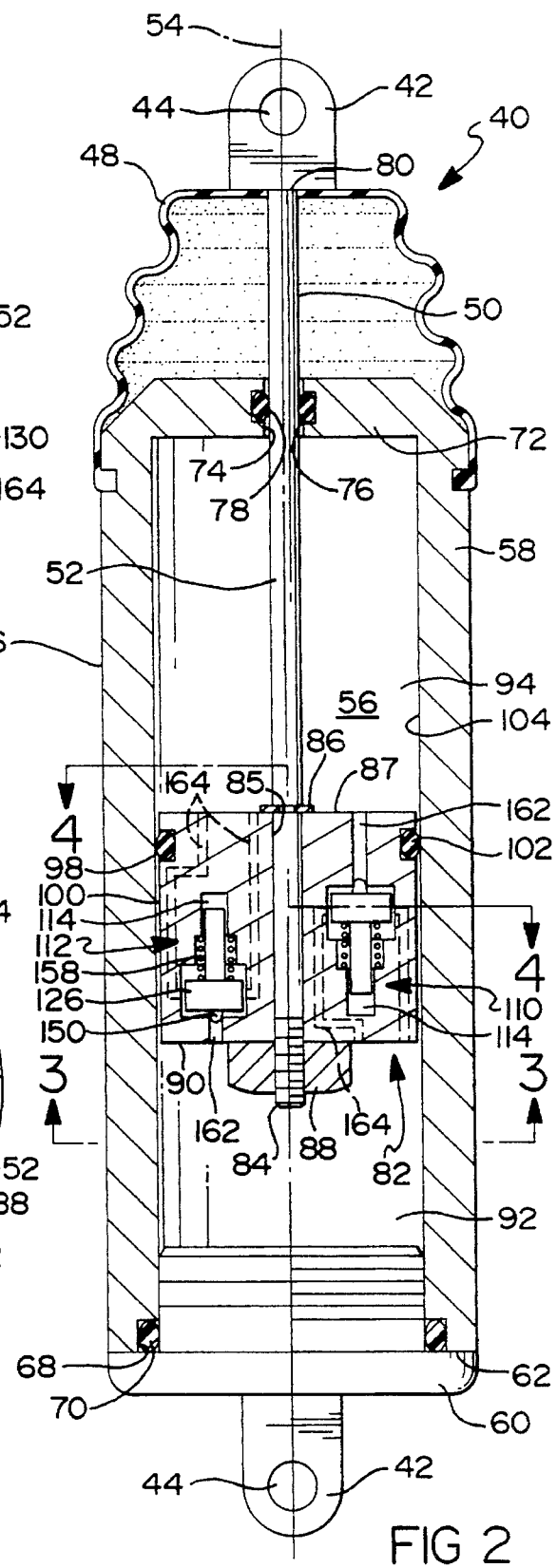
FIG 3
FIG 2

INFINITE HYDRAULIC CHECK

BACKGROUND OF THE INVENTION

The present invention relates generally to a hinge assembly such as that used with vehicle doors, and more particularly to a hydraulic infinite door check cylinder assembly that includes a controlled check release which maintains a door at a desired position unless a predetermined check effort is applied to release a needle from a closed or checked position, allowing movement of hydraulic fluid through a piston disposed in a cylinder bore.

Mechanical checks are typically used in vehicle hinge assemblies to check door movement. Such mechanical checks have a limited number of door check positions. Further, mechanical checks typically loose a large portion of their ability to check movement of a vehicle door within three to five years. Mechanical checks are also subject to particulate contamination, further deteriorating their ability to function.

Pressurized gas cylinders are also used with vehicle hinge assemblies. Door movement using pressurized gas cylinders may typically only be counterbalanced within a very narrow temperature range. Inert gases are subject to large density variations resulting from changes in temperature. As a result, pressurized gas cylinders do not readily counterbalance a door in an open position under low temperatures, and yet over assist the same door from such an open position under elevated temperatures. Pressurized gas cylinders are also subject to constant stress because of the pressurized nature of the gases within the cylinders. Such stress may result in cylinder leakage and failure.

Despite their limitations, mechanical checks and pressurized gas cylinders have continued to be favored because of user objection to other means of door checking that result in an audible "pop" when a check release is activated to permit door movement.

SUMMARY OFT HE INVENTION

An improved infinite hydraulic door check cylinder assembly provides an infinite number of door check positions while allowing quiet and consistent activation of a door check release by way of a set check effort when door movement is desired. The inventive assembly is a closed system that is extremely durable and reliable, with limited likelihood of contamination and having no use related degradation of check effort. A differential check effort is also possible whereby different check efforts may be required for door opening and closing.

In a preferred embodiment, the hydraulic check cylinder assembly comprises a sealed cylinder with a longitudinally extending bore adapted to hold a hydraulic fluid. A cylinder rod is received in the bore of the cylinder with a first end of the rod extending through an aperture of the cylinder. A piston is movably received within the bore and defines hydraulic fluid reservoirs on either longitudinal side of the piston. A second end of the cylinder rod is secured to the piston.

A hydraulic check release is disposed within the piston. The check release permits fluid flow through the piston from one of the hydraulic fluid reservoirs to the other reservoir when an appropriate check effort is applied on the rod relative to the cylinder. The check release includes an annular needle cavity extending along a longitudinal axis with a closed first portion and a second portion, the second portion including a high-flow by-pass port along an inner circumference. An annular needle extends along the longitudinal axis and has a needle body adapted to be movably received in the first portion of the needle cavity and a needle head adapted to be movably received in the second portion of the needle cavity. The needle head has a front side and a back side. A tip extends away from the front side of the needle head. The needle is biased outwardly from the cavity so that the tip engages a seat of a high-pressure fluid inlet orifice, when the needle is in a closed or checked position. A hydraulic fluid reservoir outlet is disposed between the by-pass port and the reservoir opposite to the reservoir connected to the high-pressure fluid inlet orifice.

In operation, a sufficient check effort is applied to the cylinder rod to overcome the biasing of the needle, forcing the needle further into the needle cavity. Initially, the area of pressure application is limited to the tip of the needle. Hydraulic fluid is displaced from the first portion of the cavity toward the front side of the needle head with some of the fluid flowing through the partially obstructed by-pass port. This flow is possible because of a radial gap formed between the needle head and the inner circumference of the second portion of the needle cavity.

The force applied to the needle increases after the needle tip releases, allowing the hydraulic fluid driven through the inlet orifice, to place and hold the needle in a fully open position as long as flow continues. The gradual activation of the check release is extremely quiet while simultaneously providing an infinite number of potential door check positions.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of a hinge assembly according to the present invention.

FIG. 2 is a cross-sectional view of a hydraulic infinite door check cylinder assembly taken along lines 2—2.

FIG. 3 is a cross-sectional view of the assembly of FIG. 2 taken along lines 3—3.

FIG. 4 is a cross-sectional view of the assembly of FIG. 2 taken along lines 4—4.

FIG. 5 is a cross-sectional view of a check release according to the present invention with the needle in a closed or checked position.

FIG. 6 is a cross-sectional view of a check release according to the present invention illustrating the initial activation of the check release.

FIG. 7 is a cross-sectional view of a check release according to the present invention illustrating the needle of the check release in a fully open position.

DESCRIPTION OF A PREFERRED EMBODIMENT

A door hinge assembly 20 such as that used with a vehicle door is illustrated in FIG. 1. Door hinge assembly 20 includes a hinge 22 with connecting plates 24 and 26 attached about a pivot point 28 by way of a fastener 30. In the illustrated embodiment, connecting plate 24 is secured to a vehicle door while connecting plate 26 is secured to a vehicle body. Connecting plates 24 and 26 include mounting points 32 and 34, respectively, each of which includes an aperture 36 to receive a fastener 38 such as a stud and retaining clip combination.

A hydraulic infinite door check cylinder assembly 40 is secured between mounting points 30 and 32 by way of clevis mounts 42, each of mounts 42 including an aperture 44 (shown in FIG. 2) to receive fastener 36. Cylinder assembly 40 includes a sealed cylinder 46 and a protective hood 48 that eliminates potential contamination to assembly 40 and a portion 50 of a cylinder rod 52 from corrosion and contamination.

Cylinder assembly 40 is shown in greater detail in FIG. 2. Rod 52 extends along a longitudinal axis 54 of cylinder 46 and is received in a cylinder bore 56 of a cylinder body 58. Cylinder 46 includes a cylinder cap 60 that is threadingly engaged to a first end 62 of cylinder body 58. Cap 60 includes one of the two clevis mounts 42 with aperture 44. End 62 includes a slot 68 that receives a hydraulic fluid seal 70 such as an O-ring. Seal 70 is in facial contact with cap 60 and cylinder body 58. Seal 70 works in combination with the threaded cap 60 to seal end 62 of cylinder 46.

A second end 72 of cylinder body 58 is closed with the exception of an aperture 74 adapted to receive cylinder rod 52. Aperture 74 has a groove 76 that receives a hydraulic fluid seal 78 such as an O-ring. Seal 78 is in facial contact with both cylinder body 58 and rod 52 and works to seal end 72. Exposed portion 50 extends outwardly away from aperture 74 and includes the other clevis mount 42 with aperture 44 at an end 80 of the cylinder rod 52.

A piston 82 is movably received within bore 56 with an end 84 of rod 52 secured to piston 82. Piston 82 includes an aperture 85 to receive rod 52. A snap ring or shoulder on the rod 86 at a first longitudinal side 87 and a threaded nut 88 at a second longitudinal side 90 secure rod 52 to piston 82. A hydraulic fluid reservoir 92 is defined between cap 60 and longitudinal side 90 of piston 82 and a hydraulic fluid reservoir 94 is defined between end 72 and longitudinal side 87 of piston 82. Piston 82 includes a groove 98 at an outer circumference 100 that receives a hydraulic fluid seal 102 such as an O-ring. Seal 102 is in facial contact with an inner circumference 104 of bore 56 and groove 98 to prevent hydraulic fluid flow around outer circumference 100 of piston 82.

Two opposed hydraulic check releases 110 and 112 are disposed in piston 82, check releases 110 and 112 adapted to permit selective fluid flow through piston 82 between reservoirs 92 and 94. Check release 110 selectively permits fluid flow from reservoir 94 to reservoir 92 while check release 112 selectively permits fluid flow from reservoir 92 to reservoir 94.

Movement of piston 82 occurs when a sufficient longitudinal force or check effort is applied to rod 52 relative to cylinder 40 to activate one of the check releases 110 and 112. Check releases 110 and 112 are damped to reduce noise generated upon check release activation.

As shown in FIGS. 2 and 5, a portion of piston 82 acts as a housing for both check release 110 and 112 that includes an annular needle cavity 114 extending along a longitudinal axis 116. Needle cavity 114 includes a closed first portion or blind hole or pocket 118 and a second portion 120. A second portion 120 includes a high-flow fluid by-pass port 122 along a chamfered inner wall 124.

An annular needle 126 extends along longitudinal axis 116 and includes a needle body 128 adapted to be movably received in first portion 118 and a needle head 130 adapted to be movably received in second portion 120. While first portion 118 is closed, hydraulic fluid must be able to move between first portion 118 and second portion 120. Thus, a radial gap 132 is preferably formed between an inner circumference 134 of first portion 118 and an outer circumference 136 of needle body 128. Alternatively, either first portion 118 or needle body 128 may include a longitudinal groove acting as a pathway for hydraulic fluid.

Similarly, hydraulic fluid must be able to flow from a back side 140 of needle head 130 toward a front side 142 of needle head 130. Thus, a radial gap 148 is formed between an inner circumference 144 of second portion 120 and an outer circumference 146 of needle head 130, inner circumference 144 being greater than outer circumference 146. At no time is there a direct flow of hydraulic fluid from closed portion 118 to by-pass 122 except by radial gap 148.

A chamfered tip 150 extends longitudinally outwardly from front side 142 of needle head 130 and is adapted to engage a seat 152 of a high pressure fluid inlet orifice 154 to seal the orifice. A biasing means such as a spring 158 biases needle 126 so that tip 150 engages seat 152 when needle 126 is in a closed or checked position. Spring 158 is disposed between back side 140 of needle head 130 and a shoulder 160 formed in first portion 118 of cavity 114. Therefore, in the illustrated embodiment, inner circumference 134 of first portion 118 is less than inner circumference 144 of second portion 120. Similarly, outer diameter 136 of needle body 128 is less than outer diameter 146 of needle head 130.

A high pressure fluid inlet 162 extends from orifice 154 to either reservoir 92 or reservoir 94. For check release 110, inlet 162 extends to reservoir 94 while for check release 112, inlet 162 extends to reservoir 92.

As shown in FIGS. 3 and 4, hydraulic fluid reservoir outlets 164 are disposed between hydraulic fluid reservoir 92 and by-pass port 122 for check release 110, and between hydraulic fluid reservoir 94 and by-pass port 122 for check release 112. These ports are shown schematically in FIG. 2 and do not depict the actual course they run. The schematic representation of ports 164 in FIG. 2 is used to show the origination and destination points of the hydraulic fluid. Outlets 164 permit the movement of fluid flowing through a port 122 into the appropriate reservoir and are on opposite sides of piston 82 for a corresponding check release 110 or 112.

FIG. 6 shows a check release 110 or 112 during initial activation. An activation force is applied to tip 150 that is greater than the biasing provided by spring 158 and hydraulic fluid pressure between floor 166 of needle cavity 114 and back side 140 of needle head 130, as it bleeds out. As illustrated by arrows 168, hydraulic fluid is driven through input orifice 154 into needle cavity 114. It is the force on rod 52 relative to cylinder 46 (shown in FIG. 2) that provides the necessary check effort to propel hydraulic fluid into the appropriate high pressure fluid inlet 162. As illustrated by arrows 170, some of the hydraulic fluid is displaced from back side 140 toward front side 142 of needle head 130. Initially, with the exception of gap 148, by-pass port 122 is totally obstructed by needle head 130 when needle 126 is in a closed or checked position. Gap 148 permits some of the hydraulic fluid to escape from needle cavity 114 during initial activation. In part, chamfered wall 124 allows hydraulic fluid release by way of port 122 while simultaneously limiting the fluid reaching front side 142 from behind. The controlled bleeding of hydraulic fluid from needle cavity 114 performs an initial damping function. The controlled bleeding eliminates the audible "pop" effect that might otherwise occur if check release were activated too quickly, forcing needle 126 almost instantaneously from a closed position to a fully open position.

In the position indicated in FIG. 6, throttled flow projected against front face 142 maintains the needle open against the biasing action of spring 158. At the indicated position, needle head 130 is still obstructing by-pass port 122.

As fluid flow is increased because of faster movement of rod 52 (shown in FIG. 2), the activation pressure is increased against front face 142, further opening needle 126 against the biasing action of spring 158. As shown in FIG. 7, the high-flow by-pass port 122 opens as needle 126 is forced further within needle cavity 114, being generally unobstructed when needle 126 is in a fully open position. In the illustrated embodiment, this takes place when back side 140 of said needle head 130 contacts a shoulder 172 formed between first portion 118 and second portion 120 of needle cavity 114. A longitudinal gap 173 preferably exists between floor 166 and an underside 174 of needle body 128 when needle 126 is in a fully open position.

Once a needle is moved to the fully open position while avoiding a "pop" that might result if there were a virtually instantaneous release of pressure, the increased area of needle 126 subjected to fluid flow as represented by arrows 168 effectively maintains the needle in either a fully open or a partially open position as long as rod 52 is in motion. Approximately 1/20 to 1/40 of the initial check effort required to provide the activation pressure to move needle 126 is generally preferred to maintain needle 126 in a fully or partially open position, depending on such ratios as the area provided by inlet 162 or inlet orifice 154 as well as the total surface area of front side 142 of needle head 128 and tip 150. If rod 52 is momentarily stopped, however, needle 126 quickly returns to its closed and checked position under the biasing action of spring 158.

The relative magnitude of force necessary to overcome the checked position of needle 126 depends on a number of variables. In the illustrated embodiment, such variables include door weight and door center of gravity, and the resulting perpendicular moment arm length for cylinder assembly 40. If a particular door weight and center of gravity results in a desired check effort of 25 foot pounds (300 inch pounds) to move needle 126 from its checked position to its fully open position, and the packaging information indicates that the perpendicular moment arm for cylinder assembly 40 is 1.5 inches, then 200 pounds of holding effort would be required by the check release to maintain rod 52 in place. If cylinder 46 has a projected area of 0.50 in$^2$, the hydraulic pressure required to move needle 126 from its checked position would be 400 psi.

A differential check effort, wherein a differing force must be applied to rod 52 (illustrated in FIG. 2) relative to cylinder 40 to activate a check release, may be created between check releases 110 and 112 illustrated in FIG. 2. Thus, a force or check effort to start movement of piston 82 in one longitudinal direction may be greater than that required to start movement in the opposite direction. A differential check effort may be created using a number of means. For example, the biasing of springs 158 may be different between check releases 110 and 112, or the projected area of high pressure inlet orifice 154 may be different.

The same variables used to create a differential check effort may be used to adapt the present invention to a large number of different applications. For example, the present invention may be used to replace mechanical checks for vehicle doors. Unlike the present invention, mechanical checks have a limited number of door checking positions. Further, mechanical checks typically loose approximately a large portion of their ability to check door movement within three to five years. Mechanical checks are also subject to particulate contamination. In contrast, there is no use related degradation of check effort with the present invention, and because hydraulic infinite door check cylinder assembly 40 is a closed system, there is a reduced possibility of contamination. Thus, the present invention is both durable and reliable.

Alternatively, the present invention may be combined with the pressurized gas cylinder principles. Pressurized gas cylinders are subject to constant stress with an inert gas constantly under pressure. Such stress may result in cylinder leakage and failure. Further, inert gases are subject to density variations related to temperature changes. As a result, pressurized gas cylinders typically do not readily maintain a door in an open position under low temperatures, and yet over assist the same door from such an open position under elevated temperatures. Infinite checking of a door using a pressurized cylinder is only possible in a very narrow temperature range.

A preferred hydraulic fluid is oil, particularly since such a fluid has little density variation over a wide temperature and pressure range. However, if power assistance such as that available using a pressurized gas cylinder is required, cylinder 46 may also be charged with an inert gas under pressure or a spring loaded accumulator arrangement, to obtain a net force. Depending on the vehicle packaging situation, this extra force could be either in the opening or closing directions. For example, if a pressurized bladder were disposed between cap 62 and piston 82 having a net pressure greater than that to release either check release 110 or 112, rod 52 would be biased outwardly of bore 56. Essentially, such a bladder would act as an accumulator.

In the illustrated embodiment, rod 52 extends outwardly the greatest distance when hinge 22 is open. However, the greatest play of rod 52 exists at such an orientation because a large portion 50 of the total volume of the rod 52 is outside of bore 52 of cylinder 46. A vacuum bubble is created in bore 56 of cylinder 46. In an alternative embodiment, it may be desirable to place hinge 22 in an open orientation when exposed portion 50 of rod 52 is minimized, reducing play.

Preferred embodiments of the present invention have been described. It is to be understood that variations and modifications may be employed without departing from the scope of the present invention. Accordingly, the following claims should be studied to determine the true scope of the present invention.

I claim:

1. A hydraulic check release comprising:

a housing with an annular needle cavity extending along a longitudinal axis, a first longitudinal end of said cavity including a closed bore first portion with a floor and a second longitudinal end including an open second portion, said second portion including a fluid by-pass port along an inner circumference; and an annular needle extending along said longitudinal axis, said needle having a needle body adapted to be movably received in said closed bore first portion of said needle cavity such that a longitudinal gap is created between an underside of said needle body and said floor of said closed bore first portion, a needle head adapted to be movably received in said second portion of said needle cavity, said needle adapted to seal a high pressure fluid inlet orifice, wherein said needle is biased longitudinally outwardly of said cavity, a diameter of said second portion of said cavity being greater than a diameter of said needle head, creating a radial gap between said needle head and said second portion to provide a path for fluid flow between said first closed portion and said second portion.

2. A hydraulic check release as recited in claim 1, wherein a tip extends longitudinally outwardly from a front side of said head and is adapted to engage a seat of said high pressure fluid inlet orifice.

3. A hydraulic check release as recited in claim 1, wherein a biasing means is disposed between a surface of said closed bore first portion and said needle.

4. A hydraulic check release as recited in claim 3, wherein said biasing means is disposed between a back side of said needle head and a shoulder formed in said closed bore first portion of said cavity.

5. A hydraulic check release as recited in claim 4, wherein said biasing means is a spring.

6. A hydraulic check release as recited in claim 1, wherein said port is adapted to be at least partially obstructed by said needle head when said needle is in a closed position and unobstructed when said needle is in a fully open position, said closed position defined when said tip engages a seat of said inlet orifice.

7. A hydraulic check release as recited in claim 6, wherein said needle is in said fully open position when a back side of said needle head contacts a shoulder formed between said first portion and said second portion of said needle cavity.

8. A hydraulic check release comprising:

a housing with an annular needle cavity extending along a longitudinal axis, a first longitudinal end of said cavity including a closed bore first portion with a floor and a second longitudinal end including an open second portion, said second portion including a fluid by-pass port along an inner circumference;

an annular needle extending along said longitudinal axis, said needle having a needle body adapted to be movably received in said closed bore first portion of said needle cavity such that a longitudinal gap is created between an underside of said needle body and said floor of said closed bore first portion, a needle head adapted to be movably received in said second portion of said needle cavity, said by-pass port adapted to be partially obstructed by said needle head when said needle is in a closed position and unobstructed when said needle is in a fully open position, said closed position defined when a tip extending longitudinally outwardly from a front side of said head engages a seat of a fluid inlet orifice, a diameter of said second portion of said cavity being greater than a diameter of said needle head, creating a radial gap between said needle head and said second portion to provide a path for fluid flow from said closed bore first portion to said second portion as said needle moves from said closed position to said fully open position; and a spring disposed within said closed bore first portion to bias said needle longitudinally outwardly of said cavity.

9. A hydraulic check cylinder assembly comprising:

a sealed cylinder with a longitudinally extending bore adapted to hold a hydraulic fluid;

a cylinder rod received in said bore with a first end of said rod extending through an aperture of said cylinder;

a piston movably received within said bore and defining hydraulic fluid reservoirs on either longitudinal side of said piston, a second end of said cylinder rod secured to said piston; and a hydraulic check release disposed in said piston, said check release adapted to permit fluid flow through said piston from one of said hydraulic fluid reservoirs to the other of said hydraulic fluid reservoirs and movement of said piston when a sufficient longitudinal force is applied to said rod relative to said cylinder, said check release including an annular needle cavity disposed within said piston and extending along a longitudinal axis, a first longitudinal end of said cavity including a closed first portion with a floor and a second longitudinal end including an open second portion, said second portion including a fluid by-pass port along an inner circumference, and an annular needle extending along said longitudinal axis, said needle having a needle body adapted to be movably received in said closed bore first portion of said needle cavity such that a longitudinal gap is created between an underside of said needle body and said floor of said closed bore first portion, a needle head adapted to be movably received in said second portion of said needle cavity, said needle head having a front side and a back side, and a tip extending longitudinally outwardly from said front side of said needle head, wherein said needle is biased longitudinally outwardly of said cavity, said needle head and said second portion defining a passageway to provide a path for fluid between said closed bore first portion and said second portion;

a high pressure fluid inlet extending from one of said hydraulic fluid reservoirs to said second portion of said needle cavity and including an inlet orifice with a seat adapted to receive said tip of said needle; and a hydraulic fluid reservoir inlet disposed between said high-flow by-pass port and the other of said hydraulic fluid reservoirs to receive hydraulic fluid flowing through said port.

10. A hydraulic check cylinder assembly as recited in claim 9, wherein there are at least two oppositely disposed hydraulic check releases.

11. A hydraulic check cylinder assembly as recited in claim 10, wherein said port is adapted to be partially obstructed by said needle head when said needle is in a closed position and unobstructed when said needle is in a fully open position, said closed position defined when said tip engages said inlet orifice.

12. A hydraulic check cylinder assembly release as recited in claim 11, wherein said needle is in said fully open position when said back side of said needle head contacts a shoulder formed between said first portion and said second portion of said needle cavity.

13. A hydraulic check cylinder assembly release as recited in claim 12, wherein a differential check effort is created by a stroke of a first of said check releases being different than said stroke of a second of said check releases, said stroke being the longitudinal distance between said closed and said fully open position.

14. A hydraulic check cylinder assembly as recited in claim 10, wherein a differential check effort created by a seat area of a high-pressure inlet orifice of a first of said check releases is different than that created by a seat area of a high-pressure inlet orifice of a second of said check releases.

15. A hydraulic check cylinder assembly as recited in claim 9, wherein a spring is disposed between a back side of said needle head and a shoulder formed in said first portion of said cavity.

16. A hydraulic check cylinder assembly as recited in claim 9, wherein an accumulator is disposed within one of said hydraulic fluid reservoirs.

17. A method of using a hydraulic check release comprising the steps of:

receiving a needle with a needle body and a needle head with a back side and a front side in a housing with an annular needle cavity extending along a longitudinal axis, a first longitudinal end of said cavity including a closed bore first portion with a floor and a second longitudinal end including an open second portion, a radial gap formed between said needle head and said needle cavity;

biasing said needle longitudinally outwardly of said needle cavity;

seating said needle head against a seat of a hydraulic fluid input orifice, placing said needle in a closed position;

applying a force to said needle greater than said biasing;

forcing said needle into said cavity;

creating a longitudinal gap between an underside of said needle body and said floor of said closed bore first portion;

displacing hydraulic fluid from said back side of said needle head toward said front side of said needle head by way of said radial gap; and unobstructing a high-flow by-pass port positioned along an inner circumference of said second needle cavity adjacent said needle head when said needle head is in said closed position.

18. A method as recited in claim 17, wherein said forcing step comprises the step of driving hydraulic fluid through said input orifice into said needle cavity.

19. A method as recited in claim 18, wherein said seating step comprises the step of seating a tip of said needle head against said seat of said input orifice, said tip extending longitudinally outwardly from said front side of said needle cavity.

20. A method as recited in claim 19, wherein said forcing step comprises the further steps of:

applying a first force to said needle by forcing hydraulic fluid solely against said tip; and applying gradually a second force to said needle greater than said first force by forcing hydraulic fluid against said larger front side of said needle head.

21. A method as recited in claim 18, wherein said hydraulic check release is received in a piston of a sealed hydraulic cylinder extending longitudinally with the piston acting as said housing and a hydraulic fluid reservoir defined on each longitudinal side of the piston and a high pressure fluid inlet disposed between said input fluid orifice and one of said hydraulic fluid reservoirs, and a cylinder rod received in said bore of said cylinder with a first end extending longitudinally through an aperture of the cylinder and a second end secured to the piston, said driving step comprising the step of:

moving said cylinder rod relative said cylinder; and propelling hydraulic fluid from said one of said hydraulic fluid reservoirs into said high pressure fluid inlet.

22. A method as recited in claim 21, further comprising the step of moving hydraulic fluid flowing through said port by way of a hydraulic fluid reservoir outlet, said outlet disposed between said port and the other of said hydraulic fluid reservoirs.

* * * * *